(No Model.)
F. H. PERRY.
PNEUMATIC TIRE.
No. 553,566. Patented Jan. 28, 1896.
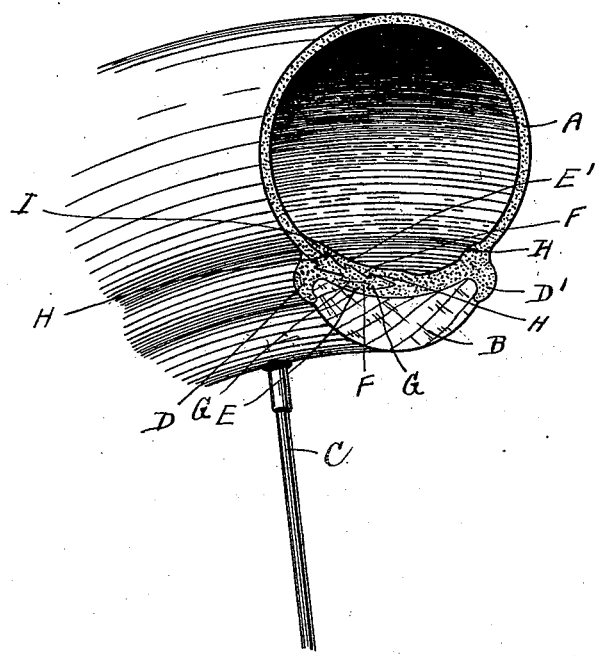
Witnesses
A. C. Whiting
Emma Kester
Inventor
Fred H Perry
By his Attorney
Rufus B Fowler

UNITED STATES PATENT OFFICE.

FREDERICK H. PERRY, OF MONTPELIER, VERMONT.

PNEUMATIC TIRE.

SPECIFICATION forming part of Letters Patent No. 553,566, dated January 28, 1896.

Application filed January 2, 1895. Serial No. 533,557. (No model.)

*To all whom it may concern:*

Be it known that I, FREDERICK HENRY PERRY, a citizen of the United States, residing at Montpelier, in the county of Washington and State of Vermont, have invented a new and useful Improvement in Pneumatic Tires, of which the following is a specification, reference being had to the accompanying drawing, forming a part of the same, in which the figure represents a portion of a pneumatic tire shown in transverse sectional view and embodying my invention.

My present invention relates to a pneumatic tire consisting of an annular tube provided with interlocking edges adapted to be held in engagement with each other by the pressure of air within the tube; and it has for its object to provide means for the interlocking of the edges of the tube, and also to provide means for the attachment of the tube to the rim of the wheel.

In the accompanying drawing, A denotes an air-tube forming the tire.

B denotes a portion of the wheel-rim, and C one of the spokes.

The air-tube A is formed of a sheet of any suitable material, preferably of a rubber, having its edges interlocked to form a tube, and being provided upon its outer surface with two hook-shaped ribs D D' adapted to inclose and hook under the rounded edges of the rim B.

One of the edges of the sheet forming the air-tube A is bifurcated, forming lips E E', the inner surfaces of said lips being furnished with ratchet-shaped teeth F F. The opposite edge of the sheet forming the air-tube A is provided upon its opposite surfaces with ratchet-shaped teeth G corresponding with, and adapted to fit the teeth F upon the lips E E', so the shoulders H of the teeth will engage each other when the lips E E' are pressed together, causing the edges to be securely united by the interlocking of the teeth whenever the air-tube A is inflated, causing the pressure of the compressed air upon the inner surface of the lip E' to press the lips together. The lip E' is extended beyond its toothed surface, as at I, forming a flexible edge adapted to lie against the inner surface of the air-tube and be held in close contact therewith by the pressure of the air within the tube in order to form a joint between the edge I and the inner surface of the tube and prevent the compressed air from working under the lip E'. In order to render the joint between the inside of the air-tube and the edge I more effectual, I prefer to reduce the thickness of the edge I and make it flexible, so the pressure of the air will cause it to conform to and hug closely against the inner surface of the air-tube.

The air-tube is attached to the rim B by means of the hooked ribs D D', which inclose and hook under the rounded edges of the rim B, and these ribs are held closely against the edges of the rim B by means of the pressure of the air within the air-tube, which is exerted to maintain the cylindrical shape of the air-tube and hold the ribs D D' against the rim B. When the air-tube A is deflated its sides can be compressed and the ribs D D' disengaged from the edges of the rim B.

In order to cause the air-pressure upon the inner sides of the air-tube A, to be exerted with more force above the hooked lugs D D', I thicken the air-tube opposite the hooked lug D', as at H.

As shown and described, the pneumatic tire is composed of a single tube filled with compressed air, but it will be obvious that the air-tube A may form a cover inclosing an inner seamless flexible tube, if desired.

If the air-tube A is formed of rubber it may be slightly vulcanized, leaving the edge I unvulcanized and flexible, so as to form a flap adapted to be pressed against the inner side of the air-tube and form an air-tight joint therewith.

What I claim as my invention, and desire to secure by Letters Patent, is—

1. A pneumatic tire formed of a sheet of suitable material having one of its edges bifurcated forming lips E and E', provided with teeth on their opposing surfaces, and having its opposite edge provided with teeth engaging the teeth on said lips, substantially as described.

2. A pneumatic tire formed of a sheet of suitable material, having one of its edges bifurcated forming lips E and E' provided with teeth on their opposing surfaces and having its opposite edge provided with teeth engaging the teeth on said lips, the outer of said lips being adapted to be attached to the rim of a wheel, and the inner of said lips overlying the toothed edge of the sheet and adapted to be pressed against said edge by the pressure of the air within the tube, substantially as described.

3. A pneumatic tire formed of a sheet of suitable material having one of its edges bifurcated forming an outer lip E and an inner lip E' provided with teeth on their opposing surfaces, and having its opposite edge provided with teeth engaging the teeth on said lips and hook-shaped ribs D, D' adapted to inclose the edges of a wheel rim projecting from the said outer lip E, substantially as described.

4. A pneumatic tire formed of a sheet of suitable material, having one of its edges bifurcated forming lips E and E' provided with teeth on their opposing surfaces and having its opposite edge provided with teeth engaging the teeth on said lips, whereby said edges are interlocked to form an air tube, the inner of said lips being extended in the form of a flexible flap, as I, adapted to be pressed against the inner side of said air tube by the pressure of the air within the tube and form an air tight joint, substantially as described.

Dated this 29th day of December, 1894.

FRED. H. PERRY.

Witnesses:
HARLAN W. KEMP,
DELLA A. FAY.